(12) United States Patent
Dempsey

(10) Patent No.: US 9,405,927 B2
(45) Date of Patent: Aug. 2, 2016

(54) TRI-MODULE DATA PROTECTION SYSTEM SPECIFICATION

(71) Applicant: Douglas Ralph Dempsey, Easton, PA (US)

(72) Inventor: Douglas Ralph Dempsey, Easton, PA (US)

( * ) Notice: Subject to any disclaimer, the term of this patent is extended or adjusted under 35 U.S.C. 154(b) by 10 days.

(21) Appl. No.: 14/466,930

(22) Filed: Aug. 27, 2014

(65) Prior Publication Data

US 2016/0063267 A1    Mar. 3, 2016

(51) Int. Cl.
  *G06F 21/10*   (2013.01)
  *G06F 21/60*   (2013.01)
  *G06F 21/62*   (2013.01)

(52) U.S. Cl.
  CPC .................. *G06F 21/6218* (2013.01)

(58) Field of Classification Search
  CPC ........................................................ H04L 63/08
  USPC ........................ 726/28, 24; 713/158, 168, 193
  See application file for complete search history.

(56) References Cited

U.S. PATENT DOCUMENTS

| 2002/0062451 | A1* | 5/2002 | Scheidt et al. ............... 713/201 |
| 2003/0016829 | A1* | 1/2003 | Chu .............................. 380/281 |
| 2003/0208686 | A1* | 11/2003 | Thummalapally et al. ... 713/193 |
| 2009/0106551 | A1* | 4/2009 | Boren et al. ................. 713/158 |
| 2009/0313465 | A1* | 12/2009 | Verma et al. ................. 713/153 |
| 2010/0023782 | A1* | 1/2010 | Prakash et al. ............... 713/193 |
| 2010/0250934 | A1* | 9/2010 | Watanabe et al. ............. 713/168 |
| 2013/0227286 | A1* | 8/2013 | Brisson ......................... 713/168 |

* cited by examiner

*Primary Examiner* — Haresh N Patel

(57) ABSTRACT

The present invention provides a system, method and apparatus for protecting data:
by separating limited data from the data storage on a primary host,
and retaining only header information and the header information key at the primary host,
and without the inclusion of any header information or identification of data,
sending and storing the limited data at a secondary host,
wherein retaining that limited portion of the data,
and generating a limited data key to identify the limited portion of the data,
and storing and connecting the generated key with the limited data,
and sending and storing the limited data key to a tertiary host,
wherein the limited data key being stored and connected with the header information key.
Furthermore, to provide means for strong validation as well as header information key synchronization, a plurality of predetermined code set values being contained in data tables at each host, from which a different code value being used for each transmission of data sent and received. Upon receiving each code, the code set validation process executes by means of matching the received code, followed by sending the next code within the code set, for every transmission leg, by consecutively pointing to the correct code value in the code set subsequently required of the data operation. The code set furthermore providing the key synchronization of the data header key, that value also being referenced in like manner for the exclusive use of linking data at the primary and tertiary hosts.

2 Claims, 8 Drawing Sheets

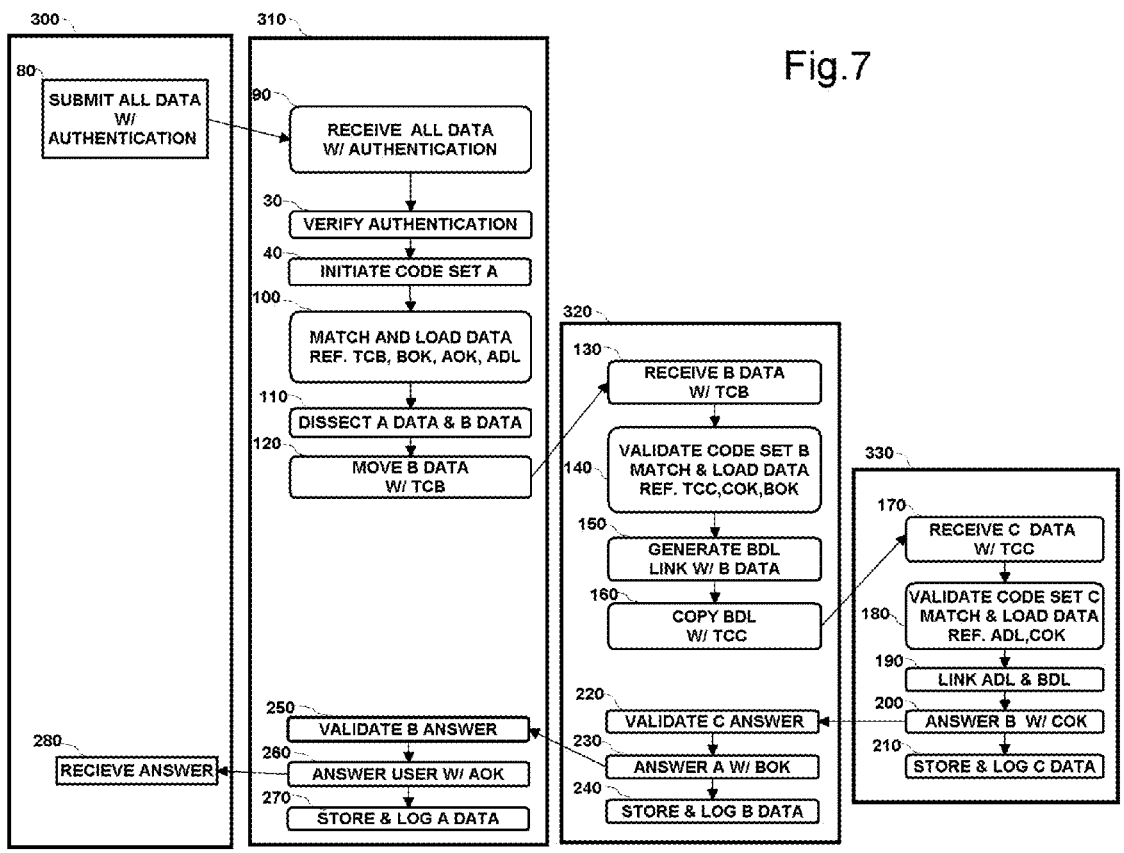

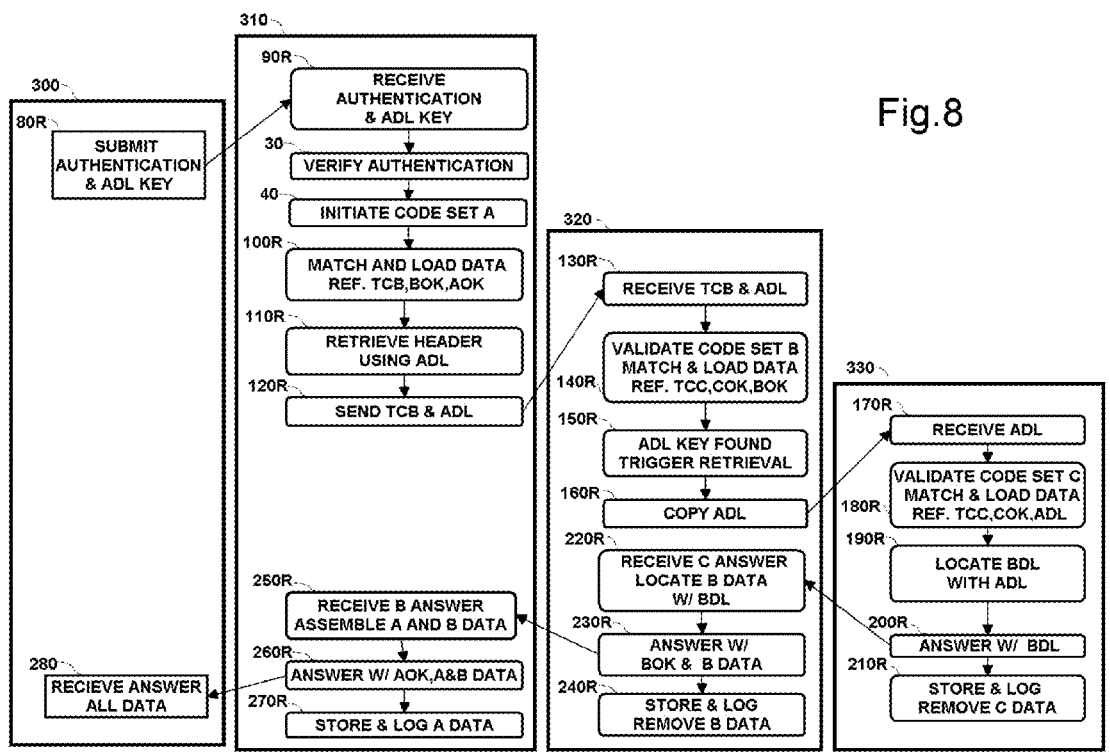

TRI-MODULE DATA PROTECTION SYSTEM SPECIFICATION

The present invention provides a methodology to protect data in a novel way, using multiple hosts to assist with the protection process and the retrieving of the protected data utilizing those same hosts.

BACKGROUND OF THE INVENTION

1. Field of the Invention

The present invention provides a methodology to protect data in a novel way, using multiple hosts to assist with the protection process and the retrieving of the protected data utilizing those same hosts.

2. Related Art Discussion

With advances in technology and the expansion of the Internet, on-line transfers of critical data has become more commonplace every day. This has lead to an increase in the motivation to steal data: whether transactions, personal information, communications, media or other forms of sensitive data.

Sensitive information in many cases is obtained by stealing data from one or more databases. Database hacking typically involves theft of information from a storage database. Also an important point of vulnerability is attacking while the data is in transit, by "man-in-the-middle" attacks where the data is "sniffed" out by someone else who somehow has access to the network.

In many cases theft of information from a data storage site results from an "inside job" by an employee with relative ease of access to the database. An employee may be enticed into such criminal activity by substantial potential payments from other criminals using the information for their own illegal purposes.

In many cases, such thefts have occurred from unencrypted databases, but obtaining encryption certificate and key information is possible for an insider, and even encrypted database access is possible in such cases.

Overview of Current Technologies in Protecting Data

Currently, almost invariably, with using a data protection service when protecting data, it requires a high level of trust of the people empowered with capabilities to view or steal data within the data facility. The issue becomes especially apparent when using cloud-based storage services where the data is moved away from the owner.

In most cases, where administered data centers/services are used to store data, the databases are actively overseen by personnel with knowledgeable backgrounds and skills allowing them access to the sensitive data.

When there are people at the data sites with the know-how to find and use the data, there is a potential for theft of that data. At the present time, if we were to ask a database administrator within a typical data center if it were possible to steal or even a look at any sensitive data, in most cases the answer would undoubtedly be in the affirmative.

With nearly all methods to secure data, encryption is the primary means for protection, and is an effective method as it renders data unreadable without the key to decipher the data. Encryption is especially effective against the "outsider" who has no access to an encryption algorithm or certificate, but a lesser degree of protection when the key to the encryption may be exposed to an insider.

Some protection methods use a code or license given to the individual who must utilize the code to retrieve data that is stored elsewhere. In this case, the stored data can remain viewable to other people who may be on the network and able to see the transferred data in motion in a complete and legible form.

Or, in many cases, an insider can find the stored data with some knowledgeable probing.

Some current techniques for protection also include methods of cutting a portion of the data fields and separating in two spots. This method still communicates the vital links back to the original data, so, though it comes closer to complete seclusion between locations, it is still very feasible for an insider to assemble usable data when this method is used.

Popular current methodology for storing or moving any data is to include both the data header and a key to identify the data. The data in this complete format can be identified and could be usable to another with ill intent.

Also, a popular means of transferring data is to include all data, or at least data that is identifiable in transit. Since the identifiable key and/or header information is normally included, this implies that the data is in a usable format for reading, identifying or further manipulation. This, opening up a possible man-in-the-middle attack on the network.

In most all cases, one or the other location used in protection has all the information potentially available to re-assemble the original data.

On the other hand, if we were to remove the header and any other possible identifier to the data, as in our embodiment, this would render the data as unidentifiable and in a crippled, unusable state.

Broad Benefits of the Invention

In our embodiment, during and after the data protection, data is protected solidly against theft at any stage of the protection. Moving the core of the sensitive portion away from the primary location, the system does not include any identifying information with that data. No name, description, subject, or any header information is included in the transfer. Even the primary index key is omitted in the partial data transfer.

The system outwardly makes any potential data to be stolen incomplete, unconnected, and invisible between the final storage locations. The data owner/user retains sole control of the primary host application using only the original data header for that control.

Data keys for both portions of the data record remain only respectively available at each individual site, lacking any exposure to each other. To assemble them back together, the connection between both identifier links are found only at another third site.

Thus, with complete data seclusion, a high level of security is attained between all sites. Any one, or even two simultaneous attacks to the data would prove futile.

Both man-in-the-middle and insider attacks would provide only unusable, unidentifiable data. Once the data has been protected, it has had vital components removed at both ends, rendering it inaccessible from either data site, or even both sites at once.

In our embodiment it will always take all three simultaneously integrated applications to reassemble the protected data for any single data record.

Therefore, even any attempt at theft would be unlikely, and any partial attempt would prove to be unsuccessful with alarms going off pointing back to the attempted network address.

Alarms and Logging

The question may be considered: Why aren't immediate alarms normally sounded when an attempt is made at data theft in most cases? Two possible problems with this are considered:

First, the access technology used when the theft occurs may be without any usable attribute to flag an attack event. A breach of data may not appear outside of the norm, using only standard normal channels for authorized and trusted data personnel.

Second, logging, and tracking data operations by its inherent nature, introduces potential breaching by possible linking of logged data back to other protectively held data. Time values, for example, could possibly be used to match the log with the original data, depending on the data traffic, and the wherewithal to put it together.

Whereas with our embodiment, we can, and do log the operations, because the data moved is without related time information, or other information usable for linking data between hosts.

Since the system logs all operations, any theft attempt is logged with the originator address, and an alarm signaled. This logging procedure therefore provides the final bastion against any successful attempt at data theft.

Objects and Advantages of the Invention

The system provides a service to data owners/users for the object of protecting various forms of electronic data against data theft.

Benefits of Structure

The combination of the structural factors prove to be a strong mechanism against data theft whether in motion or at rest, because the act of protection:
1. requires all of three separately managed entities to protect or retrieve data,
2. moves limited core data with imperceptible identity,
3. stores limited core data with imperceptible identity,
4. provides sole control of protected data with the data owner,
5. validates all stages of protection and
6. logs anomalies with notification capabilities.

A foundational assumption held behind the concept of the invention is that unidentifiable data is unusable data. It is resistant to searching and linking, and is not usable in almost any practical case after the data is protected.

Both during and after the data has been processed through the protection system, data is safe from outside eyes and/or potential thieves. No location outside of the owner-held location is ever exposed to all of the original data. Only the primary application, which is under exclusive owner control is exposed to all the data, and that, only prior to its protection.

Retrieving and re-assembling the original data after protection requires all three parts from disparate locations:
1. the data header to see what the data is.
2. The remaining (core) data.
3. The way to find and reassemble the data.

The conclusion made here is that it's not feasible that someone, including knowledgeable "hackers", would attempt a three-prong attack at three different locations to obtain data. Any possible method in obtaining the data in a usable format requires proper access solely through the owner and the first application, of which only the owner has access. And, it follows, the chance of any one successfully actually accomplishing a full breach of data would be extremely low, if not impossible.

BRIEF SUMMARY OF THE INVENTION

The present invention is directed to a system and method for preventing theft of electronic data when the system is used as a part of an operation in the moving and storing of data for the purpose of protection.

As used throughout the specification and claims which follow, the term "host", is used to describe a computer that mediates multiple access to databases mounted on it or provides other services to a computer network. (Oxford Dictionaries)

Other important terms used are defined in the Terms Used Section found at the end of this specification document.

BRIEF DESCRIPTION OF THE DRAWINGS

FIG. 7 DATA PROTECTION USING DIRECT INPUT—Secondary Embodiment

FIG. 8 DATA RETRIEVAL USING DIRECT INPUT—Secondary Embodiment

REFERENCE NUMBERS FOR FIGS. 1-8

Figure 1:
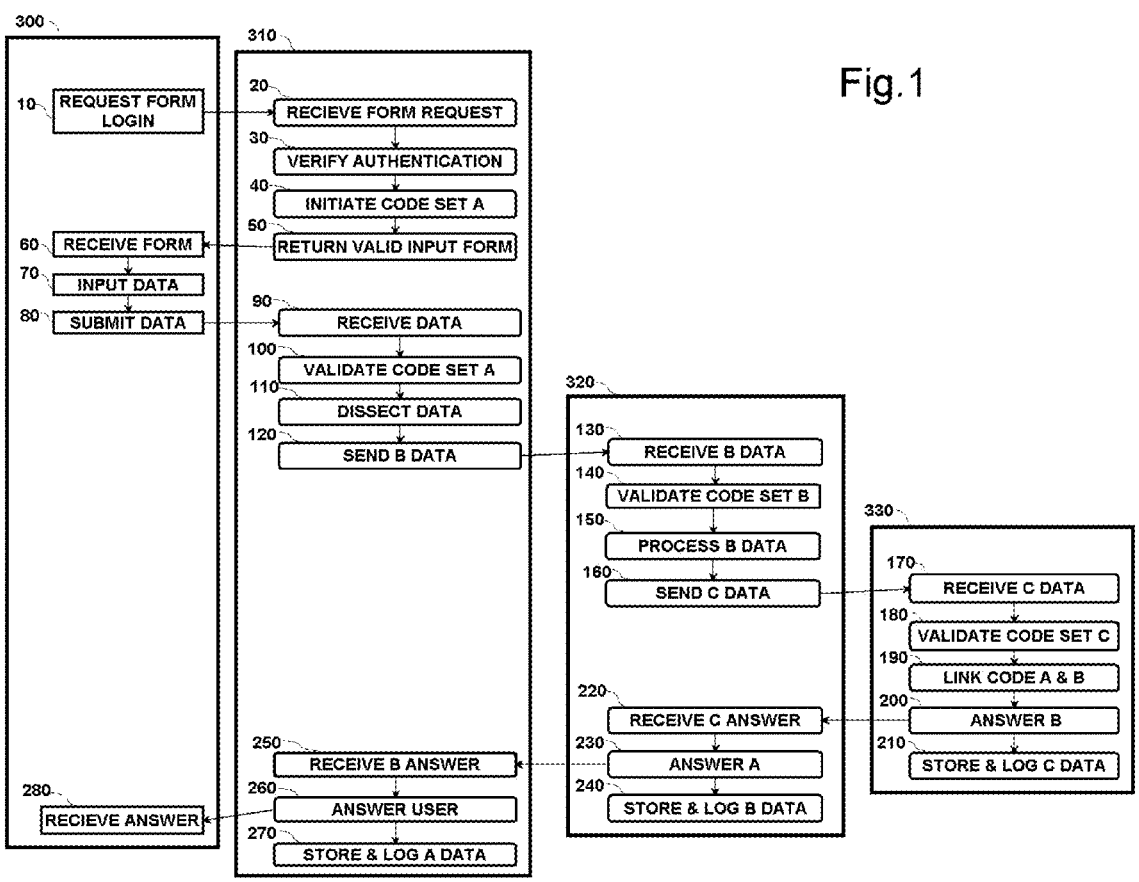
FIG. 1 DATA PROTECTION SYSTEM DATA FLOW OVERVIEW—Primary Embodiment

| PROTECTION OPERATION | | RETRIEVAL OPERATION | |
|---|---|---|---|
| 10 | Request for a protection operation | 10R | Request for a retrieval operation |
| 20 | Request received at Host A | 20R | Request received at Host A |
| 30 | Authentication | 30R | Authentication |
| 40 | Host A validation and code set initiation | 40R | Host A validation and code set initiation |
| 60 | DI Receive validated form with the TCA | 60R | DI Receive validated selection list |
| 70 | DI data entered | 70R | DI data record selection |
| 80 | DI data submit to A | 80R | DI data submit ADL to A |
| 90 | Host A Receive submitted data | 90R | Host A Receive ADL |
| 100 | Code Set A validation | 100R | Code Set A validation |
| 110 | Host A dissect data | 110R | Host A dissect data |
| 120 | Host A submit data to B | 120R | Host A submit ADL to B |
| 130 | Host B receive TCB, B data | 130R | host B receive TCB, ADL |
| 140 | Host B validate with the TCB | 140R | Host B validated with the TCB |
| 150 | Host B generate BDL | 150R | Host B trigger retrieval operation |
| 160 | Host B copy BDL to C | 160R | Host B copy ADL to C |
| 170 | Host C receive BDL | 170R | Host C receive ADL |
| 180 | Host C validate with TCC | 180R | Host C validated TCC |
| 190 | Host C connect ADL and BDL | 190R | Host C locate BDL w/ ADL |
| 200 | Host C return a response to B | 200R | Host C return BDL to B |
| 210 | Host C store ADL and BDL and log | 210R | Host C log and remove B Data |
| 220 | Host B receive response from C | 220R | Host B receive BDL and locate B Data |
| 230 | Host B return a response to A | 230R | Host B return B Data to A |
| 240 | Host B store B Data and log | 240R | Host B remove B Data and log |
| 250 | Host A receive response from B | 250R | Host A receive response from B |
| 260 | Host A return response to DI | 260R | Host A return response to DI |
| 270 | Host A store A Data and log | 270R | Host A update A Data and log |
| 280 | DI receive response from Host A | 280R | DI receive response from Host A |

-continued

| PROTECTION OPERATION | RETRIEVAL OPERATION |
|---|---|
| 300 Data Interface (DI) | |
| 301 Host A | |
| 302 Host B | |
| 303 Host C | |

DETAILED DESCRIPTION OF THE PREFERRED EMBODIMENTS

Reference will now be made to the exemplary embodiments illustrated in the drawings, and specific language will be used herein to describe the same.

It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The invention provides a system and method for protecting data and preventing data theft through separating it between two host locations and externally keying each portion: one with a static key and one dynamic, and without any identifiable links while in transit or at rest, rendered without any means of connecting the two portions without another third location.

FIG. 1-8 Detail

FIG. 1 shows a basic overall view of the data flow topology using either type of operation.

Figure 2:
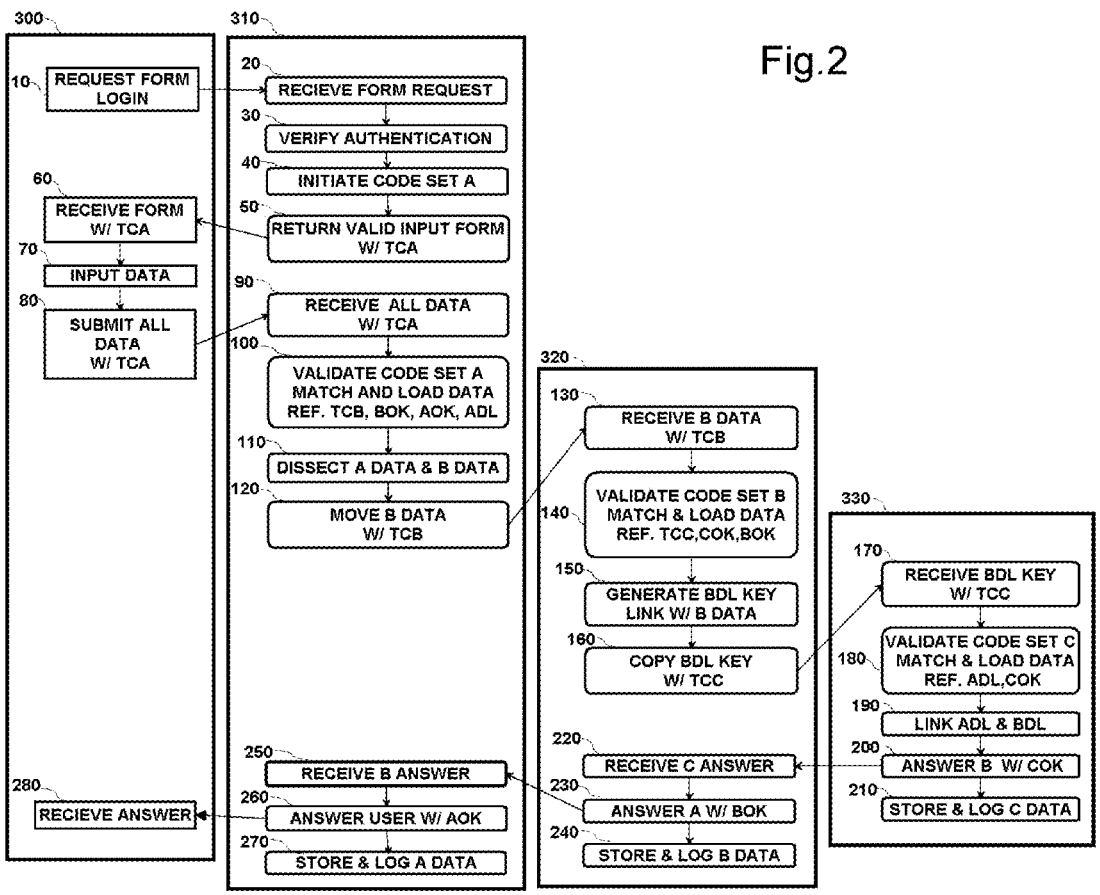
FIG. 2 DATA PROTECTION SYSTEM CODE SET WITH DATA—Primary Embodiment

FIG. 2 displays code set functions with the data flow using a protection operation.

Figure 3:
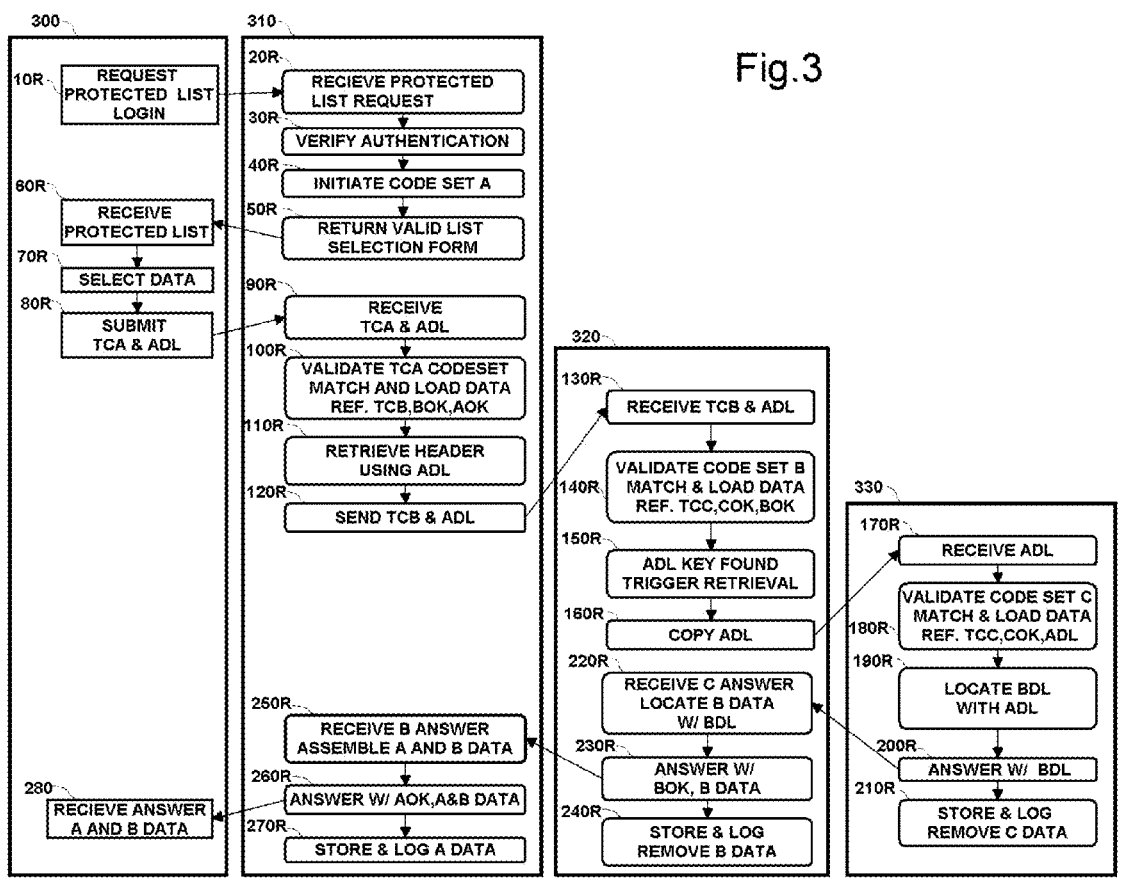
FIG. 3 DATA RETRIEVAL FROM PROTECTED DATA—Primary Embodiment

FIG. 3 displays code set functions with the data flow using a retrieval operation.

Figure 4:
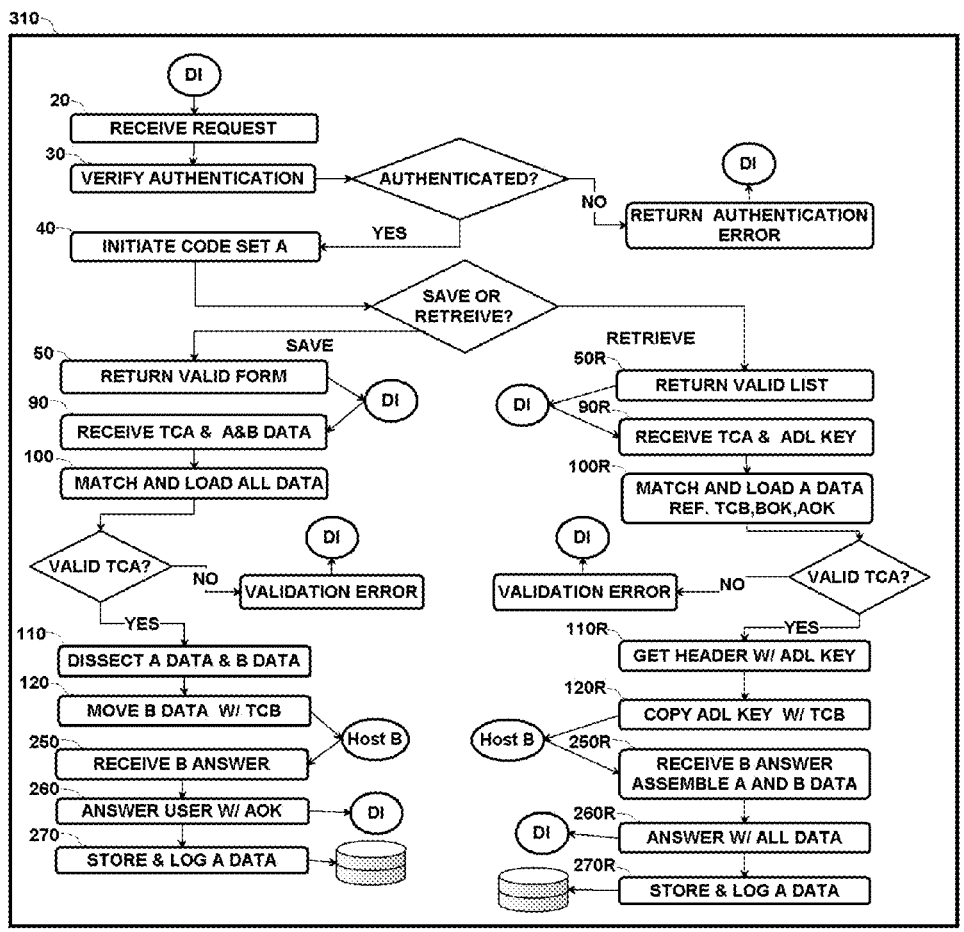
FIG. 4 DATA PROTECTION AND RETRIEVAL ON HOST A—Primary Embodiment

FIG. 4 displays overall program logic for Host A processing including code set and validation functions for both protection and retrieval operations.

Figure 5:
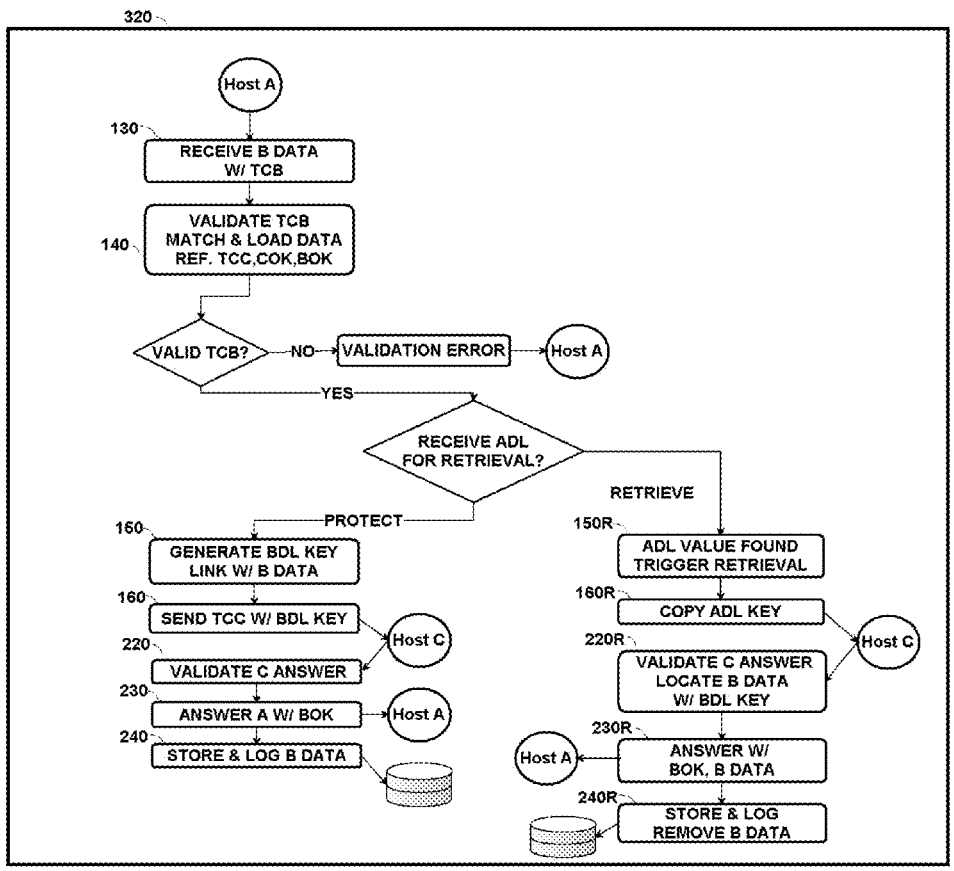
FIG. 5 DATA PROTECTION AND RETRIEVAL ON HOST B—Primary Embodiment

FIG. 5 displays overall program logic for Host B processing including code set and validation functions for both protection and retrieval operations.

Figure 6:
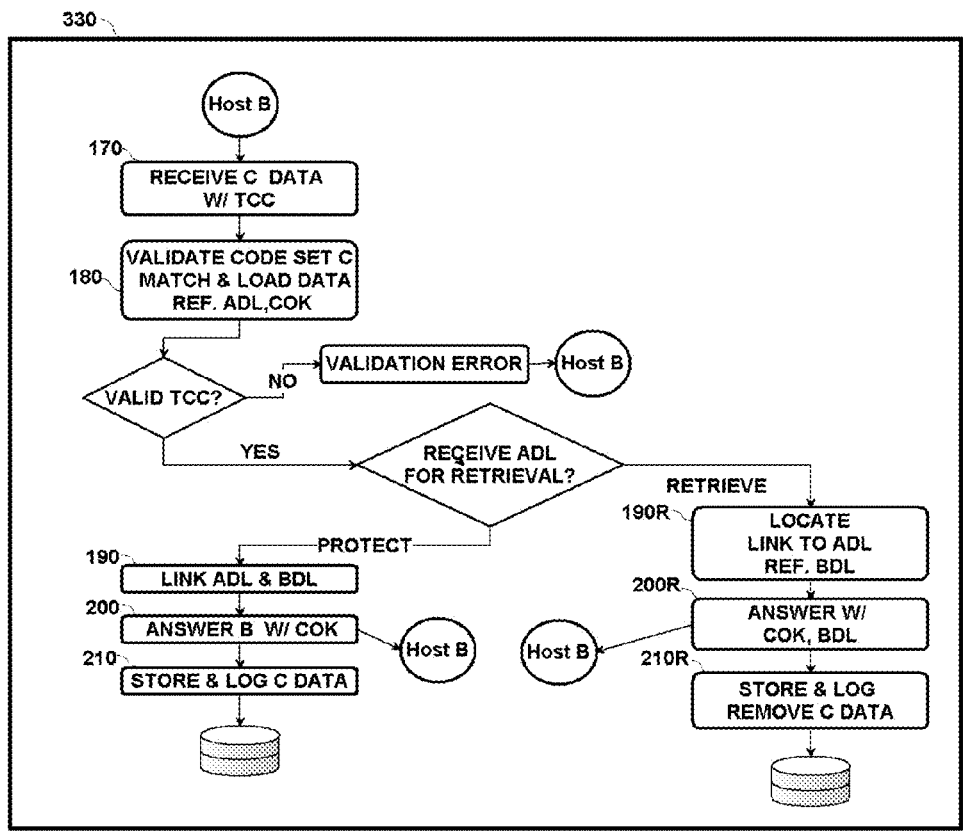
FIG. 6 DATA PROTECTION AND RETRIEVAL ON HOST C—Primary Embodiment

FIG. 6 displays overall program logic for Host C processing including code set and validation functions for both protection and retrieval operations.

FIG. 7 displays overall program logic for a secondary embodiment of direct formless input protection using previously unprotected data.

FIG. 8 displays overall program logic for a secondary embodiment of direct formless retrieval of protected data.

Static Elements in Data Record Protection and Retrieval Operations

FIG. 1 is an overall view of the flow of data within this process of protection, from the initial request for validation to the final step of receiving a response.

FIGS. 1-8 refer to identical static elements described as follows:

300 User Agent/Data Interface
310 User Application/Host A
320 Service Application/Host B
330 Service Application/Host C The protection methodology employs at least three Host entities for processing, housing and protecting the data, plus, in the embodiments described, a prior-art data interface entity (DI) for access to the system by the data owner or user.

The network connection between all Host locations would include up-to-date firewall and SSL connections to internet or private network provision.

Three server-client applications, operationally functioning together as a single application, connected on a network, each at physically separate individual data sites, individually executing various processes described, for the object of protecting electronic data against data theft.

Host Protection Components

Each Host is comprised of one or more:
  Server Application for:
    Receiving connections
    Processing data operational requests
    Retrieving data from sender
    Processing and manipulating data
  Client Application for:
    Posting data
    Retrieving data from response
    Processing and manipulating data
    Sending email or posted alerts
  Integrated Client and Server Database for:
    Saving, Retrieving Editing data All three Hosts work together to complete an operation of saving or retrieving protected data, with each Host providing a distinct purpose in processing and protecting the data.

Host A Set Up and Management

Host A application runs on: the data owner/user's local computer on the user's network, or housed in a data center: any of which is network-accessible via the data interface.

Host A data remains under complete control of the data owner. The service provider has no access to the data stored at the Host A database. The application, including the server, client and database is only executed under the control of the owner/user.

A data protection service provider may provide help and assistance in the setup of the system, updates of the code sets, system or system data, but for the purpose of this specification, should be allowed no other access to the user data without direct intervention by the owner.

For full protection against any breaches by the service provider or insider, the user/owner Host access configuration is managed by the user/owner. This configuration includes the URL/URI and port used by the server for receiving connections. It also includes users and user password tables.

Though not required for the protection operations, the user/owner would be provided with additional means for configuration, management of the local database, and possibly other means for reporting and queries to the various tables, by utilization of one or more directly accessible, locally executable applications.

Host B and Host C Set Up Management

In order to maintain mutual inaccessibility, Host B and Host C applications run at separately housed computers at separately managed data sites.

Host B would be in the control of the service provider, another third party, or the user.

Host C would normally be in control of the service provider.

The service provider updates the code set and system data and any other system updates as needed.

The processing required for each Host is summarized below.

Host a Data Protection Primary Functions

Host A is the primary control application in which the following are the main functions in a data manipulation:
  receiving requests for programmed data manipulation from the data interface;

authenticating sender;
code set initialization and validation;
issuing to the sender the forms and data used for saving and requesting data;
receiving structured input data;
dissecting and separating the programmed input data;
sending/posting programmed limited data to Host B;
receiving programmed response from posting to Host B;
returning programmed response to the data interface;
storing and retrieving programmed limited data header;
logging operations.

Host B Protection Primary Functions

Host B is the secondary application in which the following are the main functions in a data manipulation:
receiving programmed core information;
authenticating sender;
validation and code set initialization;
generating data core data link
sending/posting data core key;
receiving programmed response from posting;
returning programmed response;
storing and retrieving programmed core information and data core key;
logging operations.

Host C Protection Primary Functions

Host C is the tertiary application in which the following are the main functions in a data manipulation:
receiving core or data header key for either protection or retrieval;
authenticating sender;
validation and code set initialization;
returning programmed response;
storing or retrieving data links for core and header;
logging operations.

Data Interface

An element of prior art, the Data Interface (DI) is the primary access for the protection and retrieval operations.

Actions of data manipulation include as a minimum: saving and retrieving protected data.

System Management

For the management of each Host and system management:
Management System for:
Configuration and system parameters
Code Set Updates
Data Maintenance System Configuration Configuration at each Host site includes but not necessarily limited to:
The HTML page design for data interface forms and answered pages/displays
HTML page sequence setup for posting and receiving
Email notification options
Data structure to be protected
Data header and data core fields
Data types for individual uses, for example: text, hyperlink, photo link and size, server file name, URL
Server resource requests with procedure and upload calls
Merchant Database as required for scope in use as a multiple user service
Associated Server Host URLs Primary Embodiment The following describes the first embodiment, and how it protects (Claim 1) and retrieves (Claim 2) a single data record loaded with name/value pairs sent from an HTML form POST using HTTP protocol.

Data Interface

In the primary embodiment, the data interface (DI) would be a standard HTTP Internet Browser (user agent), for example, "Microsoft Internet Explorer": connecting to the first Host (Host A) via a secure SSL Internet connection. This type of interface allows the user to control the application from various internet devices, and still providing authenticating for access.

Host a Data Management

Host A would provide general data management capabilities for data not yet protected, allowing data to be protected by selected choice, as seen with the retrieval process in the primary embodiment.

Data Types Used for Protection

The actual protected data types and field structures used by the system and capable of protection may vary substantially, though the data does require an acceptable point of separation between the header and data. Therefore, the type of data should be configured to allow for this separation.

Nevertheless, in a case where the data header is normally inseparable, such as with a photo, or document file, the header can contain the identity and subject, date and time stamping; and the data core contain a single data field with the value of a cryptic, illegible file name referencing a file on the B Host database, or a hyper-link to another distant location or URL/URI. The header portion always containing all fields usable for identification.

Fail Safe Operations

If any procedure fails, or if an invalid transmit code is received by any Host, the operation would either time-out, or return a response to the sending Host and DI with the nature of the failure, such as a mismatched code. Any such failure will halt the completion of the operation and log an error and potentially an alarm depending on the severity level of error as determined at the configuration.

This error and anomaly checking further assures in the integrity and maintained security of the protected data. Any time a serious alarm occurs, the system may be halted or other further notifications may take place.

Though serious breaches are not likely, the tracking of any attempts becomes an important aspect in taking possible additional steps in firewall configuration, etc.

This consistent checking for errors may not be included in drawings for reasons of maintaining clarity in the main protection purpose of the embodiments.

Protection Operation

Operations described are for single data record protection and for single data record retrieval.

Data Components

The data components included in the protection operation are described below.

Data Header

For the purpose of data storage and protection, the header information alone (A Data) is retained at Host A.

The A Data includes any and all identifying portions of the information, including identification label, date/time stamp, subject matter or any other information used to identify the particular data record. A Data is retained alone with the Host A database. No parts of it are shared with B Data.

The data header primary key value: the A Data Link, (ADL) is obtained from Code Set A described below, and is retained for connection with the A Data at Host A.

Data Core

The data core (B Data) is the non-header portion of the data record to be further protected by sending it to another Host (Host B), after rendering it unidentifiable.

B Data sent is absent any:
- record identifier
- date/time stamp value
- subject information
- or any information which can otherwise be used to identify that data sent.

The B Data Link (BDL) is the primary key identifying the B data and is dynamically generated.

Protection Operation Sequence

In this primary embodiment, for the purpose of protecting a data record,

10 a request for a protection operation is sent from the DI to Host A as an URL or URI request in HTTP protocol. User and password authentication values are sent with the request.

20 The request with the user information is received at Host A.

30 The received request is checked for proper authentication including user name and password validation in the user database.

40 The code set validation initiation process retrieves a code set record containing the next set of validation codes by using a randomly generated record pointer between one and the number of records available in the code set table.

The Host A transmit code value (TCA) is used as the first code in the sequence in the operation and at initialization, the code set record is flagged to prevent duplicated initialization by another operation.

50 Host A returns the validated form and initial transmit code (TCA) embedded (hidden) as a name/value pair within the form post.

60 The DI receives the validated form containing the TCA from the code set embedded with the HTML FORM name/value pairs, allowing it to be posted back to Host A.

70 After the form has been provided for user input, the data is entered into the form.

80 The data to be protected is posted using HTML POST to post name/value pairs from the data interface to Host A.

The TCA is part of the input data from the form and is posted to Host A along with the data entered to be protected.

90 The posted data is received at Host A.

100 The TCA received is matched and validated in the A Code Set where the TCB, BOK and ADL values are exposed.

See Code Set Validation below.

The TCA value in the table is removed or over-written after use.

110 The data received is dissected based on the predefined header parameters contained in the configuration file.

For the purpose of data storage and protection, the header information alone (A Data) is retained at Host A.

The A Data includes any and all identifying portions of the information, including identification label, date-time stamp, subject matter or any other information which may help identify the particular data record is separated and retained alone with the Host A database.

The header information key value: the A Data Link, (ADL) is obtained from Code Set A described below, and also retained and connected with the A Data.

120 The non-header, or limited information portion of the data, or the "core" data (B Data) is removed from Host A database and transmitted to the second Host (Host B).

The B Data is sent to Host B with the TCB reference in the same validation code set.

The B Data is sent without any record identifier or Date-Time stamp value or recognizable subject information which can otherwise be used to identify the core portion of the data.

130 At Host B, the B Data is received to be stored and protected.

140 The TCB received is matched and validated in the B Code Set where the TCC, COK and BOK values are exposed.

See Code Set Validation below.

The TCB value in the table is removed or over-written after use.

150 A new code value for the B Data Link (BDL) is dynamically generated in real-time at Host B and used as the unique key for identifying the body portion of the data record.

160 The TCB received is matched in the B Code Set where the TCC and BOK are exposed. The TCC and BDL are sent to Host C.

170 Host C receives the C Data from Host B, consisting of BDL and TCC value.

180 The TCC received is matched in the C Code Set where the ADL and COK are exposed.

See Code Set Validation below.

The TCC value in the table is removed or over-written after use.

190 The BDL received is connected as the BDL value with the original ADL value exposed from the C Code Set (see below).

At this stage of protection, Host C provides the only key to link back to both the header and the core portions of the data.

200 Host C returns a response to Host B containing the COK obtained from the C code set in order to signal acknowledgment of successful operation.

210 The BDL and ADL values are stored together as the only fields in the record to link the two parts of the data record. The operation is then logged as a successful event.

220 Host B receives the response from the post at Host C. The COK is expected as a value for successful acknowledgment of the operation status.

230 Host B returns a response to Host A containing the BOK value obtained from the B code set in order to signal acknowledgment of successful operation.

240 B Data is stored at Host B and the event is logged.

250 Host A receives the response from the post at Host B. The correct BOK value is expected for successful acknowledgment.

260 Host A returns a response to the DI containing the AOK value obtained from the A code set in order to signal acknowledgment of successful operation.

270 A Data is stored at Host A and the event is logged.

280 The DI receives the response from the original post at Host A. The AOK is used for the confirmation of a successful operation.

Retrieval Operation

Protection and Retrieval Operations Compared

The operation of retrieving the protected data within the primary embodiment follows the same basic path (DI-A-B-C-B-A-DI). Any particular process that fails validation or fails for any other reason, results in an error logged, and the operation is halted at that Host, and notification returned accordingly.

Protection Retrieval Operation

FIG. 3 provides detail displaying the retrieval data flow in a retrieval operation.

The retrieval of protected data follows the same basic path and uses the same validation code set for transporting as protecting the data.

In this primary embodiment, for the purpose of retrieving a protected data record, 10R a request for a protected data list is sent from the DI to Host A as an URL or URI request in HTTP protocol.

20R The request for retrieval is received at Host A with the user information included.

30R The received request is checked for proper authentication including valid user name and password.

40R The validation initiation process retrieves a code set record containing the next set of validation codes by using a random record pointer between one and the number of records available in the code set table.

The Host A transmit code (TCA) is used to as the first code in the sequence in the operation and at initialization, the code set record is flagged to prevent duplicated initialization in another operation.

50R Host A then returns the list of protected records. At each record in the list, is the initial transmit code (TCA) and the ADL for that record embedded (hidden) within the retrieval post of the HTML form to permit the user to select and post back a retrieval.

60R The DI receives the HTML list of protected records, each with a button or link to post the desired record information, including the ADL value and TCA values for each. Each uses HTML FORM POST to send the name/value pairs to the Host A using a configured URL or URI for the server resource called.

70R The record to be retrieved is located and selected at the DI, or ADL is entered as input.

80R The record key, ADL is posted from the DI to the configured URL/URI at Host A along with the TCA.

90R The posted ADL with the TCA is received at Host A.

100R At Host A the code set validation occurs using the TCA received and matched against the codes contained in the A code set. The TCA is then removed or overwritten.

The TCB, BOK, AOK are referenced and retrieved for further use.

Note the ADL value from the operation code set is not used in a retrieval operation, as this key value has been received in the data input to signify a retrieval using that key.

110R The data received is dissected based on the predefined header parameters contained in the configuration file.

In a retrieval operation, the ADL value is contained within the input and used in following steps wherein a retrieval operation is triggered by its presence, and the value used to identify and retrieve the data header record.

120R The ADL is sent to Host B with the TCB reference in the same validation code set.

130R At Host B, the ADL and TCB is received.

140R The TCB value received is validated using the TCB in the B code set table. The TCB value in the table is removed or over-written after use.

The TCC, COK, BOK are referenced and the values retrieved in memory for further validation use.

150R At Host B the ADL is received with the value within the input, and a retrieval operation is triggered.

160R The ADL is copied along with the TCC to Host C. These two fields of information are the only components required in the C Data for a retrieval operation.

170R Host C receives the C Data from Host B, consisting of the ADL and TCC values.

180R The TCC value received is validated using the TCC in the C code set table. The TCC value in the table is removed or over-written after use.

The COK is referenced in the C code set and the value retained in memory for further use.

The ADL and COK are referenced and the values retrieved in memory from the C code set.

190R The ADL value is matched and the Key Link record retrieved from the Host C Database, wherein the BDL value is exposed for use.

200R Host C returns a response to Host B containing the BDL value referenced in the Key Link table using the ADL received.

The COK is included in the returned data in order to signal a successful operation.

210R The BDL and ADL values are removed or over-written after the retrieval, because at this point the data being referenced is no longer protected, and should not be considered as such. The operation is then logged as a successful retrieval event.

220R Host B receives the response from the post at Host C.

In a retrieval, this data received includes the BDL and COK values.

The BDL value is used to match and retrieve the B Data linked to it.

The COK value is expected at Host B as a value for successful acknowledgment.

230R Host B returns a response to Host A containing the B Data and the BOK value.

240R B Data is removed or overwritten at Host B and the event is logged.

250R Host A receives the response from the post at Host B.

The B Data is received in the response using the format configured for data display.

The BOK value is expected as a value for successful acknowledgment.

260R Host A returns a response to the DI containing the B Data and AOK as a confirmation code obtained from the A code set to signal acknowledgment of successful operation.

The B Data is returned using the format configured for data display.

270R A Data and B Data that has been retrieved is stored at Host A and the event is logged. At this point the data is unprotected, and may be reintroduced for protection by further request.

280R The DI receives the response from the original post at Host A.

The B Data is received using the format configured for data display.

The AOK is used for the confirmation of a successful operation.

Secondary Embodiment Variation

The secondary embodiment is described in order to convey a shortened version of input where a form is not desired. The direct formless input protection uses previously saved unprotected data to be "wrapped" with protection, and the steps omitted for Host A to return a form for the data input. With this protection method, upon the receipt of all the data to be protected at Host A, and further authenticating the connection request, the code set initialization would occur at that later point—after receiving the data input. Further protection processing similarly to the primary embodiment would take place from Host A.

For the retrieving of the data, a shortened methodology is also provided within the second embodiment. Again without passing back a list, or form to post the request, the request for protected data retrieval is directly submitted to Host A.

Protection Operation Sequence: Second Embodiment
See FIG. 7.

In this secondary embodiment,
for the purpose of directly protecting a data record without utilizing a pre-formatted form for manual input, 80 Submitted data for a protection operation is sent from the DI to Host A as an URL or URI request in HTTP protocol. User and password authentication values are sent with the request.

The data to be protected is structured and formatted as programmed, and posted using HTML POST to post name/value pairs from the data interface to Host A.

The TCA is part of the input data from the form and is posted to Host A along with the data entered to be protected.

90 The posted data is received at Host A.

30 The received request is checked for proper authentication including user name and password validation in the user database.

40 The code set validation initiation process retrieves a code set record containing the next set of validation codes by using a randomly generated record pointer between one and the number of records available in the code set table.

The code set record retrieved is flagged to prevent duplicated code set initialization by another operation. See Code Set Validation below.

100 The TCB, BOK and ADL values are exposed from the code set record.

The TCA value in the table is removed or over-written after use.

110 The data received is dissected based on the predefined header parameters contained in the configuration file.

For the purpose of data storage and protection, the header information alone (A Data) is retained at Host A.

The A Data includes any and all identifying portions of the information, including identification label, date-time stamp, subject matter or any other information which may help identify the particular data record is separated and retained alone with the Host A database.

The header information key value: the A Data Link, (ADL) is obtained from Code Set A described below, and also retained and connected with the A Data.

120 The non-header, or limited information portion of the data, or the "core" data (B Data) is removed from Host A database and transmitted to the second Host (Host B).

The B Data is sent to Host B with the TCB reference in the same validation code set.

The B Data is sent without any record identifier or Date-Time stamp value or recognizable subject information which can otherwise be used to identify the core portion of the data.

130 At Host B, the B Data is received to be stored and protected.

140 The TCB received is matched and validated in the B Code Set where the TCC, COK and BOK values are exposed. See Code Set Validation below.

The TCB value in the table is removed or over-written after use.

150 A new code value for the B Data Link (BDL) is dynamically generated in real-time at Host B and used as the unique key for identifying the body portion of the data record.

160 The TCB received is matched in the B Code Set where the TCC and BOK are exposed.

The TCC and BDL are sent to Host C.

170 Host C receives the C Data from Host B, consisting of BDL and TCC value.

180 The TCC received is matched in the C Code Set where the ADL and COK are exposed.

See Code Set Validation below.

The TCC value in the table is removed or over-written after use.

190 The BDL received is connected as the BDL value with the original ADL value exposed from the C Code Set (see below).

At this stage of protection, Host C provides the only key to link back to both the header and the core portions of the data.

200 Host C returns a response to Host B containing the COK obtained from the C code set in order to signal acknowledgment of successful operation.

210 The BDL and ADL values are stored together as the only fields in the record to link the two parts of the data record. The operation is then logged as a successful event.

220 Host B receives the response from the post at Host C. The COK is expected as a value for successful acknowledgment of the operation status.

230 Host B returns a response to Host A containing the BOK value obtained from the B code set in order to signal acknowledgment of successful operation.

240 B Data is stored at Host B and the event is logged.

250 Host A receives the response from the post at Host B. The correct BOK value is expected for successful acknowledgment.

260 Host A returns a response to the DI containing the AOK value obtained from the A code set in order to signal acknowledgment of successful operation.

270 A Data is stored at Host A and the event is logged.

280 The DI receives the response from the original post at Host A. The AOK is used for the confirmation of a successful operation.

Retrieval Operation Sequence: Second Embodiment
See FIG. 8.

80R The record key, ADL is posted from the DI to the configured URL/URI at Host A along with authentication values.

90R The posted ADL with the TCA is received at Host A.

30R The received request is checked for proper authentication including user name and password validation in the user database.

40R The code set validation initiation process retrieves a code set record containing the next set of validation codes by using a randomly generated record pointer between one and the number of records available in the code set table.

The code set record retrieved is flagged to prevent duplicated code set initialization by another operation. See Code Set Validation below.

100R At Host A the code set validation occurs using the TCA received and matched against the codes contained in the A code set. The TCA is then removed or overwritten.

The TCB, BOK, AOK are referenced and retrieved for further use.

Note the ADL value from the operation code set is not used in a retrieval operation, as this key value has been received in the data input to signify a retrieval using that key.

110R The data received is dissected based on the predefined header parameters contained in the configuration file.

In a retrieval operation, the ADL value is contained within the input and used in following steps wherein a retrieval operation is triggered by its presence, and the value used to identify and retrieve the data header record.

120R The ADL is sent to Host B with the TCB reference in the same validation code set.

130R At Host B, the ADL and TCB is received.

140R The TCB value received is validated using the TCB in the B code set table. The TCB value in the table is removed or over-written after use.

The TCC, COK, BOK are referenced and the values retrieved in memory for further validation use.

150R At Host B the ADL is received with the value within the input, and a retrieval operation is triggered.

160R The ADL is copied along with the TCC to Host C. These two fields of information are the only components required in the C Data for a retrieval operation.

170R Host C receives the C Data from Host B, consisting of the ADL and TCC values.

180R The TCC value received is validated using the TCC in the C code set table. The TCC value in the table is removed or over-written after use.

The COK is referenced in the C code set and the value retained in memory for further use.

The ADL and COK are referenced and the values retrieved in memory from the C code set.

190R The ADL value is matched and the Key Link record retrieved from the Host C Database, wherein the BDL value is exposed for use.

200R Host C returns a response to Host B containing the BDL value referenced in the Key Link table using the ADL received.

The COK is included in the returned data in order to signal a successful operation.

210R The BDL and ADL values are removed or over-written after the retrieval, because at this point the data being referenced is is no longer protected, and should not be considered as such. The operation is then logged as a successful retrieval event.

220R Host B receives the response from the post at Host C.

In a retrieval, this data received includes the BDL and COK values.

The BDL value is used to match and retrieve the B Data linked to it.

The COK value is expected at Host B as a value for successful acknowledgment.

230R Host B returns a response to Host A containing the B Data and the BOK value.

240R B Data is removed or overwritten at Host B and the event is logged.

250R Host A receives the response from the post at Host B.

The B Data is received in the response using the format configured for data display.

The BOK value is expected as a value for successful acknowledgment.

260R Host A returns a response to the DI containing the B Data and AOK as a confirmation code obtained from the A code set to signal acknowledgment of successful operation.

The B Data is returned using the format configured for data display.

270R A Data and B Data that has been retrieved is stored at Host A and the event is logged.

At this point the data is unprotected, and may be reintroduced for protection by further request.

280R The DI receives the response from the original post at Host A.

The B Data is received using the format configured for data display.

The AOK is used for the confirmation of a successful operation.

Code Set Validation

Code set validation is used as part of the protection process through the validation of the source of the data sent and returned between Host A, B and C. This arrangement allows enhanced security by assuring identity in each post and each reply.

Abbreviations for the codes are used throughout this document for brevity and easier reading. When an abbreviation is used, or when the term "code" is used, it invariably refers to the name/value pair with a specific value contained with the code, unless otherwise notated.

The table below provides a summary of the code set structure with individual Host utilization in sending, receiving and linking. When a value is used: whether sent, received or retained, the individual Host subsets will include those and only those values at each Host.

Part of the protection process includes the assurance that each codes subset used at each Host contains only the values used by each Host. No Host contains anything but a partial set of values. This further isolates potential linking between entities.

| Master Database/ Abbreviation | Name | Data Interface | Host A | Host B | Host C |
|---|---|---|---|---|---|
| TCA | Transmit Code A | Send | | Receive | |
| TCB | Transmit Code B | | Send | Receive | |
| TCC | Transmit Code C | | | Send | Receive |
| COK | Host C OK | | | Receive | Answer |
| BOK | Host B OK | | Receive | Answer | |
| AOK | Host A OK | Receive | Answer | | |
| ADL | A Data Link | | Retain | | Retain |

Code Set/Subset Tables Structure

The validation process and synchrony of the data record across all the Hosts is provided through the six internal validation codes.

The code set table structure and the use-and-destroy methodology prevents data identity exposure between transmission and storage.

As there are six legs of transit with every completed operation, six transmit codes are used from beginning to end of any operation.

All six of the codes in the code set record are used for each protection operation, though each Host possesses only the appropriate subset of each set based on that Host utilization.

The predetermined code values would be provided as part of the protection service provider setup and maintenance functions, or as an option for a more enterprise-level of service, the user may possibly have control of this function.

The Code Sets provide validation by matching the value with the respective code value in the same code set, thereby keeping synchronization across the Hosts.

Each code used for sending, answering or validation is included at each respective Host database.

Next, since there is no identifying information sent with the core information, an alternate referencing method is employed to provide identification of the original header data.

Code Set Referencing

In addition to validation matching, the Code Set structure also provides a method of obtaining required codes by referencing them within the same record set as the Transmit Code received by the particular Host.

The Code Sets structure allows each separate Host application to locate the correct code set record for that site based on matching the transmit code received, and thereby exposing the other validation codes in that same record set. The validation codes are sent or received according to the codes used for each Host.

The Code Set values are pre-generated and have been previously stored (or "pre-seeded") at each Host database as part of the Service maintenance duties.

Each one of the six code values in each Host Code Set Database must match-up with the same-named field values in the data sent. Otherwise the operation will return an error and not complete.

Validation codes are immediately over-written or deleted after each use, thus preventing the possibility of linking codes between data sent and data saved.

The data link to the A Data record (ADL) is also contained in the code set to identify the data header.

This Code Set referenced points to the ADL, as it is contained in the common code set record in the Database at Host A and also Host C. Though the ADL value is common between Host A and C, but it is never exposed to Host B.

Example of Code Transmission from Host A to Host B

1. The Transmit Code B (TCB) is sent from Host A to B along with the limited data core.
2. The TCB is received at Host B.
3. The TCB is located in Code Sets Database B.

Coexisting and referenced in the same Code Set record, are the following codes, in which values are to be used following this point:

C Transmit Code (TCC) to be sent to Host B
C Acknowledge Code (COK) used to match the return code from Host C to B
B Acknowledge Code (BOK) used to return an answer to Host A The result is that through this "lock-step" validation-pointer method in any operation, the Code Set structure provides the means to securely synchronize validation codes, and align the correct header link between the Hosts and in transmission as well.

See FIG. 2 for Code Set data flow illustration.

Data Format

Data format used for protection may consist of text entered, links to sites or other forms, or local data pointed to by obscure file names. This means that almost any type of data may be used, including photos, documents, etc., as long as the file names are not visually identifiable.

If links are used to point to local files at the Host B Server, a separate means of locating those files would be employed, such as uploading separately or by being emailed in an attachment.

Owner Data Protection System Management

In the primary embodiment, the owner uses an internet browser or cell phone to log in and access the system via HTTP protocol using a secure connection.

All data functions including: saving, changing, listing, retrieving and deleting functions are provided by an owner executable application at Host A, or a network client to the database.

Data templates may be used for versatility in use of variable data structures, server parameters and user authentication.

Additional Embodiment Examples

Multiple variations and embodiments are possible in the framework of the invention.

By using the basic compositional specification of:
code set validation and referencing,
header-controlled accessibility,
isolated unidentifiable data core transfer and storage,
further isolated Key Link table to unlock the protected data,
other further development of applications are possible.

Both our primary and secondary embodiment illustrate specific practical applications, though other possible means of input and output, network layering, encryption, database technologies, code set initialization and key generation are possible, for example.

Following are some other examples:

For the data interface, different types of input and output could replace the HTTP POST-ANSWER protocol used here.

Though the exact data formats for sending and receiving are not specified herein, various methods of embedding data tokens for returning data, such as XML may be utilized within the specification.

Connection protocols between Hosts may vary.

The data core key (BDL) could be predefined as an additional code in the code set, rather than as generated, as in the primary embodiment. The weakness with this method being that the BDL could be exposed to insiders with access to the code set table at Host B prior to an operation.

The data core key (BDL) could be received by another outside source.

A secondary validation can be used as a further authentication option, where the IP address of the sender is checked against a table at any Host database, for the purpose of blocking unknown connection attempts. A consideration to a downside to this method, is that it may introduce a potential link to the data holders via insider access to that table.

Setup and Configuration Options

Owner Options (Application A)

The data owner would have a choice in how the Host A is housed: either on a local network, the most critical factor being the necessity of it being operating when accessed by the user.

Owner Options (Application B)

In the primary embodiment, the service provider owns control of Host B, but as an option, it may be maintained directly by the data owner. Validating IP addresses would benefit further protection with this particular configuration, otherwise, in a multiple-user environment, it would not.

Code Set Maintenance

The service provider incorporating this method would have ownership and control of the third Host and maintenance, including seeding the Code Sets at each host.

In order to allow for multiple users of the protection services, the Code Set creation requires applications and/or database management capabilities for generating the original master tables with all seven codes.

Then, the parsing out of the specific subsets and creating loaded tables for Host A, B and C, so as to ensure proper matching takes place when the actual codes are used by operations across all three hosts would be provided by the management service/system.

With the C Host being held by the Service Provider, the code sets that are expended through various operations could be used to gauge actual use, or credits for future use: as a per-operation charge.

The code sets could be purchased in groups for a quantitative means of providing the service without intrusion into the data itself.

Host Data Templates and Owner Configuration

Though not a novel component or even necessary for the primary embodiment, templates would omit the need for executing individual applications at hosts B and C for each data owner/user using the protection service. Without templates, or similar method, protection would require individual hosts or database segregation at A and B per client.

Data Templates allow the service provider to offer protection service to multiple tenants using a single Host B, a single Host C application and single address at each for added convenience. The templates are made up of host database tables and functionality included with the application at each host, and providing versatility in data structure and other possibilities based on particular needs. Each individual template is assigned to an individual data owner or business purpose.

For the purpose of simple reuse of client setup and configuration, the template records may be copied as a basis/foundation for other similar clients and uses.

For the purpose of displaying and formatting and protection functionality, the host templates may contain (but not limited to), information on:
  user/owner demographics,
  graphics or media files,
  variable data structures,
  server parameters,
  users authentication,
  HTML pages used for input and output of individual dynamic data,
  product information,
  other possible variables.

Also, since each host is a server and database, additional files used for individual upload might be provided as needed.

Terms Used

ADL/A Data Link
  A Data Link is the primary link/key for identification of the A Data. The ADL value is a common value between Host A and Host C, and not exposed to Host B, (except in a request for retrieval of protected data). When a retrieval is processed, this data field is sent to trigger and identify a retrieval at both Host B and Host C. It is stored with the associated BDL at Host C to identify the associated ADL in the Key Link table. Unlike the BDL, the ADL values are originated from the respective code set in Host A and Host C for the current protection operation.

A Data/Header Information
  The A Data includes only the header information and any and all identifying portions of the information, including subject matter or any information which may help identify the particular data record. This portion of data is separated and retained alone with the Host A database.

BDL/B Data Link
  The B Data Link or BDL is the primary key identifying the B data. It is dynamically generated in real-time at Host B and assigned as the data core key. It is used as the primary key for linking the body of the data. The BDL is not connected with Host A or the A Data at this point.

B Data/Core Information
  The non-header, or limited information portion of the data, or the "core" data is removed from Host A database and transmitted without any identify to the second Host (Host B) for storage.

Breach
  The occurrence of data theft at an insecure or less than fully secure area of data in storage or transit. The breach may be in terms of individual data records, or by complete database or data table.

C Data
  The C Data is passed from Host B to Host C, and is comprised of the BDL for linking the B data; and the TCC for validation of the received data. Alternatively, in a retrieval, the C Data is comprised of the ADL used to locate a match and retrieve the Key Link record containing the associated BDL, and the TCC for validation of the received data.

Cloud
  The term cloud is used to denote an alternate, non-local means of management and storage of data using the internet and service providers to synchronize make data available to various devices for sharing data.

Code Set Table
  The code set table is a table that is different at each Host based on the need for individual codes in sending or receiving. The code set table contains numerous records in order to provide for the number of operations potentially occurring within the system. See the Code Set Validation section.

Code Set
  The Code Sets provide separate validation at each Host by assuring a match of the value received by the sender with the respective code value in a code set record.
  A unique value for each type of code within each set is used for sending and answering within the system.
  Each Code Set is made up of six predefined codes used for validating data receipts, and one key (ADL) for defining the primary key for the original protected data header.
  One Code Set is used for each operation of protecting data or retrieving data.
  The overall purpose of the code set is threefold, including:
    transmission validation,
    keeping operation synchronization across the Hosts and,
    storing an operation header key at Host C and Host A.

Code Set A
  Transmit codes for Host A including: TCA, TCB, AOK, BOK and ADL

Code Set B
  Transmit codes for Host B including: TCB, TCC, BOK and COK

Code Set C
  Transmit codes for Host C including: TCC, COK and ADL core information/core data record
  The portion of the protected data which is moved to Host B; also referred to as B Data.

Data Core Key
  The name/value pair indicating the value contained in the data core key or data link B (BDL) for the purpose of providing unique identification for a data core record.
  In the primary embodiment, each data core key is dynamically generated at Host B.
  The data header key and data core key are joined in a single record at Host C to provide the access for a retrieving of a protected data record.

Data Record
  A single piece of structured data which is predefined as part of the original configuration for the particular use for the data owner. All protection operation descriptions refer to a data record, unless otherwise notated.

DI/Data Interface
  The sole access to the protection system data application at Host A.

Data Header Key
  The primary key for the header portion of the protected data.
  The data header key (ADL) provides the unique identification for a data record. It is obtained from code set at Host A and Host C. The data header key and data core key are joined at Host C.

Data in Transit/Data in Motion
  The data that is being moved or transmitted from one point to another on a network, and is considered at a state requiring individual attention when preventing data theft.

Data Storage/Data in Storage/Data at Rest
  The data that is in storage after being transmitted to that point, and is considered at a state requiring individual attention when preventing data theft.

Exposed Data
  The condition of data which allows the conceivable possibility of an outside entity to view data sent or stored.

Header Data Record/A Data
   The stored header portion of data including A Data only on Host A.
Header Information
   Information contained in a header data record
Key
   A unique value used for data record identification used to link a particular data record.
Key Link Table
   The Key Link table contains the links between A Data and B Data, (DLA and DLB, respectively) allowing the data at Host A and Host B to be re-linked at the retrieval operation. The Key Link Table is uniquely housed at Host C containing two fields: ADL and BDL. Neither the Host C database, or this table contains any actual data obtained from the original data.
Limited Data
   The sectioned data which is either the header portion, or the the core portion of the protected data as described herein.
Network
   The network can be made up of internet provisioned between each Host. The network should be secured by SSL or other encryption service, and fire-walled as appropriate for typical network security at each Host.
Operation
   An operation in the present scope refers to either a protection or a retrieval of the specified data record or records used for protection.
Original Data
   The data chosen to be protected by the user/owner, being essentially, header data and core data
Primary Host
   Host A: the Host controlled by the data owner/user.
Service/Service Provider
   The entity providing the protection service through the offering of the described data protection system.
Transmit Codes
   Validation codes used between any of the six transmits in an operation. All transmit codes are contained in the code set table, and partially distributed between Host A, B and C.
   The transmit codes used for transmission validation are: TCA, TCB and TCC
   The transmit codes used for return validation are: COK, BOK and AOK.

What is claimed is:

1. A data protection system comprising:
   hardware and processors for providing limited data;
   a primary host device (Host A);
   a secondary host device (Host B);
   a tertiary host device (Host C);
   a first data interface device to transmit data to said Host A;
   said Host A to:
   receive data input, authenticate said data input, and separate out information from said data input;
   wherein said data input including: codes and parameters information, header information, and core data;
   utilize a single code set for use with a protection operation, and utilizing Code Set A from said single code set;
   reference a data header key and transmit code B within said Code Set A, and store separated data header key, said header information, and identifying and subject information;
   transfer said core data together with the referenced transmit code B obtained from said Code Set A to said Host B;
   said Host B to:
   receive said core data, validate received transmit code B, and match with a predetermined transmit code B in a Code Set B;
   point to a transmit code C in code set B, and generate a new data core key for identification of said core data;
   store said core data together with the data core key, and copy the data core key to said Host C with the transmit code C;
   said Host C to:
   receive the data core key, validate the transmit code C, and match with a predetermined transmit code C in a Code Set C;
   point to data header key value revealing a duplicate of said data header key from said Code Set A;
   store the data header key together with the data core key at a database of Host C;
   link header information at said Host A to said limited data from said Host B;
   send a return acknowledgment using acknowledgment transmit code from Code Set C to Host B, and destroy or overwrite values from transmit codes in said Code Set B;
   said Host B to:
   receive said return acknowledgment, validate the received transmit code, match with a predetermined validation code from said Code Set B, send a return acknowledgment using the transmit code from said Code Set B to said Host A, and destroy or overwrite values from transmit codes in said Code Set B;
   said Host A to:
   receive said return acknowledgment, validate the received transmit code, match with a predetermined validation code in said Code Set A, send a return acknowledgment using the transmit code from Code Set A to client input device, and destroy or overwrite values from transmit codes in said Code Set A;
   said Host A, including:
   a server program to: receive, respond with and store data, interface data between data interface and a database of said Host A, process data and database management;
   a client posting program to: transfer data to said Host B and receive responses, process data and manage database;
   a Code Set A table to: provide codes for a protection operation and host;
   a secure database for: use in processing data, storing data and returning data;
   said Host B including:
   a server program to: receive, generate keys, respond with and store data, process data and manage database;
   a client posting program to: send key to said Host C, and receive responses, process data and manage database;
   a Code Set B table to provide codes for a protection operation and host;
   a secure database to: use a database in processing data. store data and return data;
   said Host C, including:
   a server program to: receive, store keys, respond with and store data, manage keys, process data and manage database;
   a key links table to: link header and core data;
   a Code Set C table to: provide codes for a protection operation and host; and
   a secure database to: use a database in processing data and store data and return data;

wherein, access to usable data is prevented after the data is protected;

wherein, full access to protected data requires all three inter-acting hosts;

wherein, the data interface device to select and re-integrate completed data;

wherein, a data is specifically protected against unwanted or breach-able exposure to data information including: elements of protection system, single transfer breach, breach of single host database, double host database breach, and double transfer breach.

2. The data protection system as claimed in claim 1, wherein, the data interface device to:

transmit data to the Host A;

said Host A, to:

receive data input, including authentication values, and data header key value;

authenticate input source, utilize data header key value, match a primary key value in a header data record, and retrieve header information from selected data record;

utilize a single code set for use with a retrieval operation; and utilizing Code Set A from said single code set;

and transfer the data header key value together with transmit code B obtained from said Code Set A to said Host B;

said Host B, to:

receive said data header key value, and said transmit code B, and match the received transmit code B with a predetermined transmit code B in a Code Set B;

point to a transmit code C in said Code Set B, and copy said data header key value to said Host C with the transmit code C;

said Host C, to:

receive data header key value and transmit code C, and match the received transmit code C with a predetermined transmit code C in a Code Set C;

and use data header key value to match and retrieve a Key Link data record containing data header key value and to expose data core key value for selected data record;

send a return acknowledgment using a transmit code from said Code Set C together with retrieved data core key to said Host B;

destroy or overwrite values from transmit codes in said Code Set B;

said Host B, to:

receive said return acknowledgment and data core key from Host C;

validate received transmit code using validation code in said Code Set B;

use data core key value to match and retrieve matching core data record, and send a return acknowledgment using appropriate transmit code from said Code Set B with retrieved said matching core data to said Host A;

destroy or overwrite values from transmit codes in said Code Set B;

said Host A, to:

receive return acknowledgment, and validate received transmit code using validation code in said Code Set A;

send a return acknowledgment using transmit code from said Code Set A;

send said received Data B with said retrieved Data A to client input device;

destroy or overwrite values from transmit codes in said Code Set A;

said Host A, including:

a server program to: receive, respond with and store data, interface data between data interface and database of said Host A, process data and database management;

a client posting program to: transfer data to said Host B and receive responses, process data and manage database;

a Code Set A table to: provide codes for a protection operation and host;

a secure database to: use a database in processing data and store data and return data;

said Host B including:

a server program to: receive, generate key, respond with and store data, process data and manage database;

a client posting program to: send key to said Host C, and receive responses, process data and manage database;

a Code Set B table to provide codes for a protection operation and host;

a secure database to: use a database in processing data and store data and return data;

said Host C, including:

a server program to: receive, store keys, respond with and store data, manage keys, process data and manage database;

a key links table to: link header and core data;

a Code Set C table to: provide codes for a protection operation and host; and a secure database to: use a database in processing data and store data and return data.

* * * * *